United States Patent [19]
Trujillo

[11] 3,886,269
[45] May 27, 1975

[54] PROCESS FOR PREPARING ODOR AND IRRITATION FREE FORMALDEHYDE DISINFECTANT

[75] Inventor: Ralph E. Trujillo, Albuquerque, N. Mex.

[73] Assignee: The United States of America as represented by the United States Energy Research and Development Administration, Washington, D.C.

[22] Filed: Jan. 30, 1973

[21] Appl. No.: 327,982

[52] U.S. Cl. ................ 424/82; 424/334; 260/615.5
[51] Int. Cl. ................ A01n 9/24
[58] Field of Search ............... 424/82, 334; 260/615

[56] References Cited

UNITED STATES PATENTS

| | | | |
|---|---|---|---|
| 3,148,110 | 9/1964 | McGahen | 424/334 |
| 3,162,573 | 12/1964 | Geary | 424/82 |
| 3,163,493 | 12/1964 | Hess et al. | 424/334 |
| 3,541,207 | 11/1970 | Sharpe | 424/334 |

OTHER PUBLICATIONS

Kirk-Othmer-Encyc. of Chem. Tech. 2nd Ed., Vol. 10 (1966), pp. 78, 81, 93.
Chemical Abstracts, Vol. 65 (1966), p. 10/747.

*Primary Examiner*—V. D. Turner
*Attorney, Agent, or Firm*—Dean E. Carlson; Dudley W. King; Ignacio Resendez

[57] ABSTRACT new formaldehyde based disinfectants are formed by passing formaldehyde gas through a highly polar organic solvent such as dimethyl sulfoxide (DMSO) or dimethyl formamide (DMF) to form a gel-like polymer or by heating paraformaldehyde in the presence of a polar organic polyhydroxy solvent such as glycerol, ethylene glycol or propylene glycol. The disinfectants exhibit disinfection properties against bacterial vegetative cells, bacterial spores and soil organisms but are absent the penetrating odor and eye and ear irritation that is characteristic of other forms of formaldehyde.

4 Claims, 1 Drawing Figure

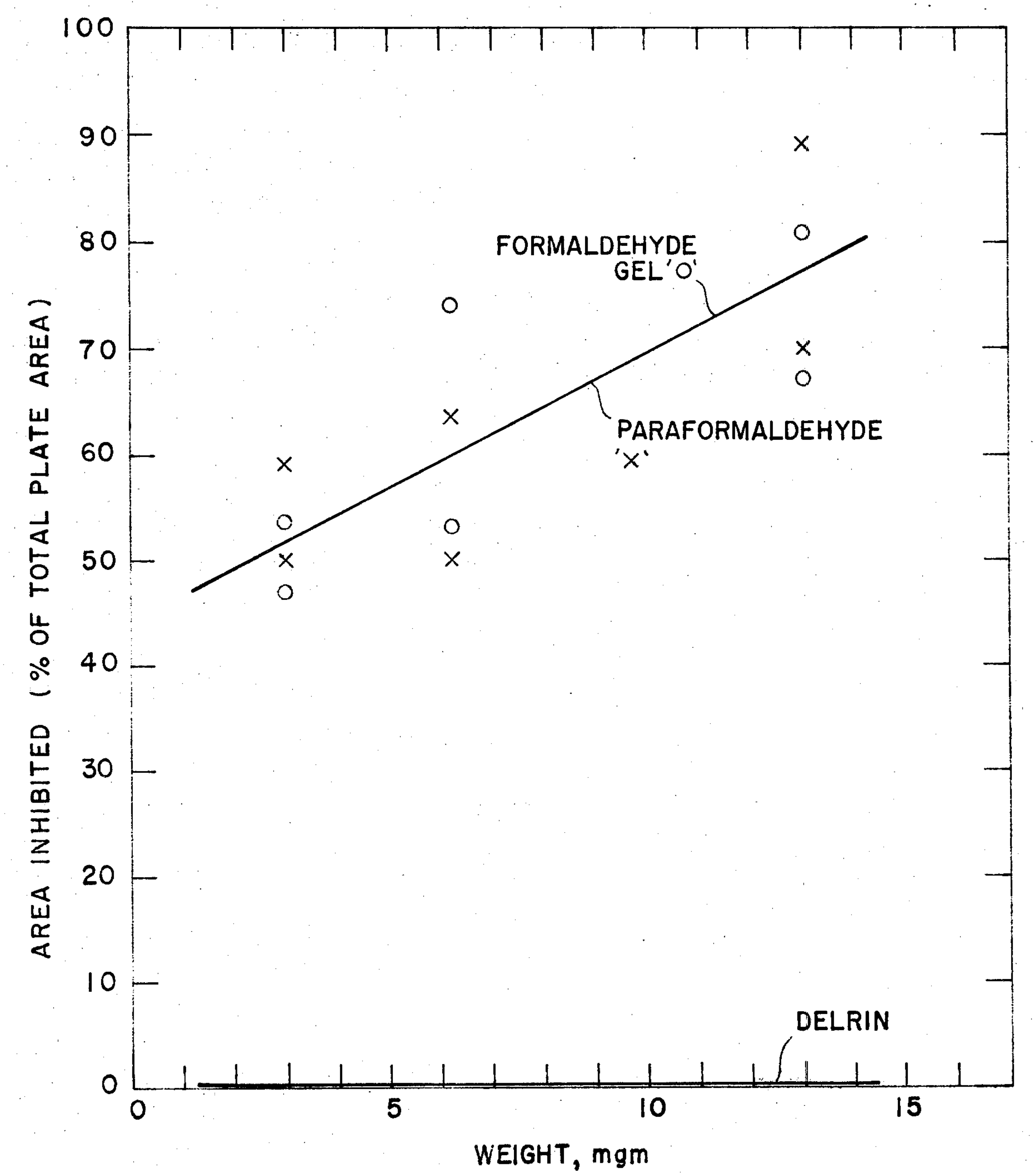
100
90
80
70
60
50
40
30
20
10
0
AREA INHIBITED (% OF TOTAL PLATE AREA)
0
5
10
15
WEIGHT, mgm
FORMALDEHYDE GEL 'O'
PARAFORMALDEHYDE 'X'
DELRIN

PROCESS IN PREPARING ODOR AND IRRITATION FREE FORMALDEHYDE DISINFECTANT

ORIGIN OF THE INVENTION

The invention described herein was made in the course of, or under, a contract with the United States Atomic Energy Commission.

BACKGROUND OF THE INVENTION

1. Field of the Invention

The present invention relates to formaldehyde based disinfectants, to methods of synthesizing the disinfectants and to methods of utilizing the disinfectants.

2. Description of the Prior Art

Formaldehyde is an irritant gas and, at the same time, a protoplasmic posion. Formaldehyde as a gas, as an aqueous solution known as formalin and as a low molecular weight polymer known as paraformaldehyde have all been shown to be extremely effective disinfectants and have been used to inhibit or destroy bacteria, fungi, yeasts and molds. However, the disinfectant use of formaldehyde has been very limited due to its hazardous properties.

Exposure to formaldehyde vapors causes irritation of the mucous membranes of the eyes and the respiratory tract and in animal experiments continued exposure to low concentration of formaldehyde has caused inflamation of the upper respiratory tract, emphysema and congestion of the lungs. The maximal accepted permissible concentration is, at present 10 parts per million by volume of air for exposures not exceeding 8 hours daily. It has been established that concentrations of 20 parts per million cause definite irritation of the eyes and upper respiratory tract in humans. The local application of aqueous solutions of formaldehyde to the eyes may cause severe irritation of the conjunctiva, lacrimation, conjunctivitis, keratitis, superficial ulcers and iritis. Sensitive workers develop dermatitis of the face, neck and arms as well as other parts of the body. Sensitivity may be acquired after prolonged contact with formaldehyde or formaldehyde containing materials. Oral ingestion or administration into the body by other routes can cause a variety of acute toxic effects.

Thus, the industrial, pharmacological and biological use of formaldehyde has entailed restrictions as to concentration in the atmosphere, the use of protective garments, precautionary handling procedures and careful personal hygiene to minimize its known effects.

SUMMARY OF THE INVENTION

The present invention relates to the preparation of materials which have the disinfectant properties of formaldehyde without causing irritation to eyes and nose and are absent the penetrating odor associated with other forms of formaldehyde. The disinfectant materials are formed by placing formaldehyde or a precursor thereof such as paraformaldehyde in contact with a polar organic solvent. One disinfectant material of this invention is a formaldehyde gel formed by passing formaldehyde gas through a polar organic solvent. A gel-like polymer forms that is absent the characteristic physical properties of formaldehyde, i.e., penetrating odor and irritation. Another material is formed by heating a mixture of paraformaldehyde and a polyol until a clear solution is formed.

The formaldehyde disinfectants exhibit disinfection properties against bacterial vegetative cells, bacterial spores and soil organisms using standard growth inhibition tests. In every case, growth of these microbiological entities is eliminated in the area surrounding the formaldehyde gel particle. In addition, sampling of the inhibited area and plating of the sample on agar revealed no subsequent microbio growth. This result demonstrates that the formaldehyde gel particles were inactivating the bacterial vegetative cells or spores and not simply inhibiting their growth.

A concentration of 0.171 mg/ml of the paraformaldehyde solution was determined to be the Minimal Inhibitory Concentration (MIC) and Minimal Bacteriocidal Concentration (MBC) for a wide variety of organisms tested at a concentration of approximately $1 \times 10^6$ microbes/ml.

These and other objects and many attendant advantages of the invention will become apparent as the invention becomes better understood by reference to the following detailed description when considered in conjunction with the accompanying drawing.

BRIEF DESCRIPTION OF THE DRAWING

FIG. 1 is a graph showing the inhibition of *B. Subtilis* growth using various weights of formaldehyde gel, paraformaldehyde and Delrin as abscissa and the percent of area inhibited for agar diffusion assay as the ordinate.

DESCRIPTION OF THE PREFERRED EMBODIMENTS

The formaldehyde gels of this invention can be formed by passing formaldehyde gas through a highly polar organic solvent such as dimethyl sulfoxide (DMSO) and dimethyl formamide (DMF). As the formaldehyde gas bubbles through and into the solvent, the viscosity increases. A solid gel forms around the insertion tube and the viscosity of the reaction mixture increases to form a gelled mass after a typical reaction period of 15 to 20 minutes. On drying, the gel is converted into a powdery polymeric disinfectant material.

While the definitive structure of the gel is not known, it is believed to be a solid, swollen polymeric gel. Physical studies of the gel indicate that the gel is a covalently-linked polymeric material of the acetal resin type. Comparison to other acetal resin types such as paraformaldehyde and a polyformaldehyde such as "Delrin" indicate that the formaldehyde gel of this invention differs in disinfectant properties from the other polymeric formaldehyde materials and also differs in the properties of irritation and smell.

It appears critical to form the gel by contacting formaldehyde gas with the polar solvent. It was attempted to form a gel by dissolving paraformaldehyde in DMSO. A solution of paraformaldehyde in DMSO was obtained by this procedure only as long as heat was applied. However, on cooling the paraformaldehyde precipitated from the DMSO once more.

The successful procedure in accordance with the invention proceeded by supplying a source of formaldehyde gas suitably by heating a fairly pure grade of paraformaldehyde within a flask to depolymerize material into formaldehyde gas. The formaldehyde gas was delivered to a second vessel containing a body of highly polar solvent. On initiation of the flow of formaldehyde gas, a solid gel-like substance is found to immediately form around the tip of the insertion tube which is below the level of the liquid solvent. It may be necessary to move the tube from time to time to prevent it from becoming clogged with the solid gel-like polymer. A second outlet tube leading to a flask containing water can be utilized to absorb the excess formaldehyde gas. Since formaldehyde gas forms solid paraformaldehyde on cool surfaces, it may be necessary to heat the reaction flask periodically to vaporize any deposited paraformaldehyde. It is also advisable to use as short a segment of glass tubing as possible to connect the formaldehyde generating flask to the reaction flask. The gas is bubbled through the solvent at a steady rate which is a moderate rate, neither a single bubble or a rapid bubbling rate. Specific examples of practice follow:

EXAMPLE 1

Fifty grams of paraformaldehyde was heated in a 100 mil single-neck, round-bottom flask. This flask was connected to a 250 ml single-neck, round-bottom flask using a short piece of glass tubing connected by a short piece of rubber tubing. The glass tubing extended into the 250 ml flask below the level of 50 ml of DMSO which was present in the second flask. The second flask was also connected to a beaker containing water via a glass tube connected to a rubber hose.

On application of heat to the first flask, the paraformaldehyde was depolymerized, liberating formaldehyde gas which passed through the tubing into the body of the DMSO solvent. The formaldehyde gas which was not dissolved or reacted in the DMSO was then passed into the beaker containing water which acted as a trap for the formaldehyde gas. The flask was heated periodically to vaporize any deposited formaldehyde. The gas was bubbled through the DMSO at a steady intermediate rate. As the formaldehyde gas passed through the DMSO, it gradually took on a more viscous consistency and a gel-like material could then be seen to form around the tube through which the formaldehyde gas was passing. Continuous passage of the gas resulted in a white-blue gel mass being formed in the 250 ml flask. After about 20 minutes, the entire volume of the DMSO was converted to this gel-like mass which is called "formaldehyde gel."

The formaldehyde gel was moved from the 250 ml flask and dried by pressing between sheets of filter paper until excess solvent could no longer be removed. The mass of gel was then dried and stored under vacuum. The gel-like mass was then in a white powder form which had the appearance of the orginal paraformaldehyde except it had no formaldehyde odor.

EXAMPLE 2

The procedure of Example 1 was repeated utilizing 50 ml of DMF in place of the DMSO. A similar gel-like blue mass was formed which on drying and storage was a white powder having the appearance of paraformaldehyde but absent paraformaldehyde odor.

The materials of Examples 1 and 2 were tested for bacteriocidal properties by means of the "agar diffusion method." In this assay of disinfectant properties, a portion of the disinfectant (applied to a filter paper disk or in solid form) is placed on an agar Petri dish which has been inoculated with micro organisms. The dish is incubated for a time and the effect on this of the disinfectant is determined by measuring the "zone of inhibition."

EXAMPLE 3

Petri plates were formed containing 10 ml of Trypticase Soy agar (4% by weight) and allowed to cool. The agar surface was then inoculated with a 10 ml inoculation containing $10^5$ to $10^6$/ml of either *B. Subtilis* or *E. Coli* vegetative cells or *B. Subtilis* spores. The 10 ml of organism was then poured off the agar plate leaving a uniform distribution of micro opganism on the agar surface. Care should be taken to remove as much excess inoculum as possible. Weighed amounts of the formaldehyde gels of Examples 1 and 2 were added to the center of the inoculated Petri plates and the plates incubated for 24 hours at 35°C. Zones of inhibition were formed indicating growth of these microbiological entities or eliminated in the area surrounding formaldehyde gel particles. Sampling of the inhibited area and plating of the sample on agar revealed no subsequent microbio growth. This result indicates the formaldehyde gel particles inactivate the microbiological entities. Furthermore, it indicates that formaldehyde gel has some aqueous transport mechanisms since a zone of inhibition was formed and further offers penetration properties which can be of considerable pharmacological and industrial value.

Since the zones of inhibition were basically circular, as indication of the extent of inhibition could be calculated by dividing the pressure diameter of the inhibition zone by the diameter of the agar plate showing growth.

The disinfectant activity of the formaldehyde gel of the invention was compared to other polyformaldehyde materials such as paraformaldehyde and polyformaldehyde resins such as Delrin. Paraformaldehyde polymer is produced by evaporating aqueous formalin and is either a flake or fine powder. Paraformaldehyde polymer contains combined water and is believed to be a mixture of polymeric hydrates with the average formula $(CH_2O)_6 \cdot H_2O$ and is formed by the condensation of methyleneglycol as indicated by the reaction scheme:

$$nCH_2(OH)_2 \rightarrow (CH_2O)_n \cdot H_2O + (n-1)H_2O.$$

The chemical composition of paraformaldehyde is best expressed by the formula $HO \cdot (CH_2O)_n \cdot H$. Paraformaldehyde powder contains both free and combined forms of water. The free water is merely attracted to the polymer by polar forces at points along its length. Water which is chemically combined with paraformaldehyde acts more or less as a terminating agent for the polymer chains. The fact that the two types of water are present in approximately equal amounts indicates that the polymer must contain about 70 polyoxymethylene units from which the molecular weight of 600 is estimated.

Polyformaldehyde resins such as Delrin also known as acetal resins, are obtained from very pure formaldehyde. These new polymers with a polyoxymethylene chain are characterized by symmetry and a high degree of crystallinity which properties are imparted to the macromolecular substance by unbranched, straight chains. Delrin is available as a white opaque material having a density of 1.415 and melting point of 175°C. Delrin is characterized by resistance to elongation and impact and by very high modulus of elasticity, approaching that of light metals. It has low moisture absorption and is the most solvent resistant thermoplastic resin other than fluorinated polyethylenes. Delrin resin is absent formaldehyde odor, is non-irritating and finds use in applications and contact with the skin since it does not cause dermatitis.

Equal weights of paraformaldehyde, formaldehyde gel of the invention and Delrin resin were subjected to the zone inhibition test as described in Example 3, the results being presented in graphical form in FIG. 1. It is found that the formaldehyde gel of the invention is absent formaldehyde odor and irritation. Equal weights of the gel and equal weights of paraformaldehyde cause approximately equivalent degrees of disinfection and affect both vegetative cells and spores. While formaldehyde gel and Delrin are absent formaldehyde odor and irritation, the formaldehyde gel of the invention is a disinfectant while Delrin exhibits no disinfectant properties. It is apparent that the formaldehyde gel of the invention differs from both paraformaldehyde and polyformaldehyde but yet exhibits the beneficial characteristics of each with respect to use as a disinfectant.

The formaldehyde gel of this invention will find use as an extremely effective disinfectant to destroy bacteria, fungi, yeast and molds. The gel can be used in dry form as a dusting powder or it can be dispersed in the aqueous carriers and topically applied to non-porous surfaces of utilized to impregnate porous structures to disinfect them. The gel may be utilized alone or in combination with various other dispersants, adjuvants or carriers as are conventional in the art of formulating dusting powders or disinfectant preparations.

Another formaldehyde based disinfectant is formed in accordance with this invention by dissolving a minor amount, suitably below 20% by weight, of paraformaldehyde in a liquid polyol such as glycerol, ethylene glycol or propylene glycol and heating to an elevated temperature above 100°C, preferably at reflux, until a clear solution is obtained. Ethylene glycol is preferred due to its lower viscosity. Once the formaldehyde enters solution, the characteristic physical properties of formaldehyde, i.e., penetrating odor and irritation to eyes and nose, are no longer evident. Disinfectant activity is substantially enhanced in the presence of an aqueous carrier for the materials. Detailed examples follow:

EXAMPLE 4

Four different formaldehyde based disinfectants, formaldehyde in water (FW), formaldehyde in ethylene glycol (FEG), formaldehyde in glycerol (FG) and formaldehyde in propylene glycol (FP) were prepared by refluxing 5 grams of paraformaldehyde in 50 ml of the appropriate solvent until a clear solution was obtained. All solutions were clear after 5 minutes of heating except for FW which required approximately two hours refluxing for a clear solution to be obtained.

The formaldehyde concentration was determined for each solution by using the phenylhydrazine hydrochloride-potassium ferricyanide method and reading the absorption at 515 nm. The resulting 10% FW solution exhibited the acrid and penetrating odor associated with formaldehyde solutions, while the FEG, FG, and FP solutions were free of such obnoxious properties.

The stock 10% formaldehyde solutions were diluted in 4% Trypticase Soy Broth in the MIC-MBC studies, while 1:10 dilutions of the stock 10% formaldehyde solutions were employed in studying the sporocidal properties of these formaldehyde based disinfectants. The 1:10 dilutions were effected using a solvent appropriate for a given disinfectant, e.g., water for FW, glycerol for FG, etc. In some studies, the 1:10 dilution was achieved using 1 part FG, FP or FEG and 9 parts water to yield solutions identified respectively at FG-W, FP-W and FEG-W. The 1:10 dilution of FW with water yields a solution which still exhibited the irritating vapors associated with formaldehyde solutions, while formaldehyde vapors were not discernible in the FG-W, FP-W, and FEG-W solutions even after heating at 40°C for 3 hours.

Stock preparations of *Bacillus subtilis*, *Bacillus brevis*, *Bacillus megaterium*, *Escherichi soli*, *Staphlococcus aureus*, and *Streptococcus fecalis* were prepared by inoculating each of these organisms into separate flasks containing Trypticase Soy Broth (4% w/v, BBL) and allowing the inoculm to shake at 23°C for 20 to 26 hours. The resulting bacterial suspensions were diluted 1:100 in 4% Trypticase Soy Broth and the microbio concentration determined by plating out with Trypticase Soy Agar (4% w/v, BBL) after appropriate serial dilutions. Serial dilutions involving vegetative cells were accomplished using dilution bottles containing 0.9% sodium chloride and 0.01% Nutrient Broth (BBL). These vegetative cells were used in the MIC-MBC studies.

*B. Subtilis* variety niger spores were prepared by an active culture technique previously described. The spores were suspended in 95% ethanol at a concentration of $6 \times 10^9$ spores/ml and were stored at −10°C.

MIC-MBC studies. Studies on the Minimal Inhibitory Concentration (MIC) and Minimal Bacteriocidal Concentration (MBC) of the various formaldehyde based disinfectants were determined using accepted protocols and techniques. The MIC studies were basically carried out by depositing varying concentrations of a given disinfectant into a series of test tubes and adding an aliquot of a bacterial suspension to each of the tubes. The bacterial suspension consisted of bacteria suspended in a complete and complex growth medium. The tubes were observed for turbidity as a sign of microbio growth after 24 and 48 hours of incubation at 35°C. The lowest concentration of disinfectant which yields a clear, non-turbid solution is denoted the Minimal Inhibitory Concentration (MIC). A 0.1 ml aliquot from each clear tube was plated out with Trypticase Soy Agar and the extent of colony development noted after incubation for 48 hours. The concentration which yields no colonies is defined as the Minimal Bacteriocidal Concentration (MBC).

Studies on the sporocidal properties of the various formaldehyde based disinfectants towards *B. Subtilis* spores were carried out by pipetting 0.1 ml of an ethanol spore suspension into screw cap test tubes and removing the ethanol under vacuum. Each study consisted of two such vials to which was added 10 ml of either a control solution or a test solution. The test solution consisted of the formaldehyde based disinfectant, while the composition of the control solution was identical to the test solution except that it contained no formaldehyde. After addition of the appropriate solution, the test tubes were insonated for 1 minute in an ultrasonic bath (20 amp, 250 v) and subsequently shaken vigorously in order to achieve a uniform spore suspension. The tubes were then placed in a Blue M constant temperature water bath at a given temperature controlled to ± 0.1°C. Samples were withdrawn periodically, serially diluted, and plated out using Trypticase Soy Agar. An incubation at 31°C for 4–5 days insured sufficient time for outgrowth.

The MIC and MBC data are presented in Tables 1 and 2 which follow:

TABLE 1

FORMALDEHYDE-WATER (FW) AND FORMALDEHYDE-ETHYLENE GLYCOL (FEG) DISINFECTANT PROPERTIES

| Organism | FW MIC[1] (Mg/ml) | FW MBC[2] (Mg/ml) | FEG MIC[1] (Mg/ml) | FEG MBC[2] (Mg/ml) |
|---|---|---|---|---|
| *B. subtilis* | 0.123 | 0.245 | 0.133 | 0.265 |
| *B. megaterium* | 0.245 | 0.245 | 0.265 | 0.265 |
| *B. brevis* | 0.123 | 0.123 | 0.133 | 0.133 |
| *E. coli* | 0.123 | 0.245 | 0.133 | 0.265 |
| *S. aureus* | 0.245 | 0.245 | 0.265 | 0.265 |
| *S. fecalis* | 0.123 | 0.245 | 0.133 | 0.265 |

[1] MIC is the Minimal Inhibitory Concentration
[2] MBC is the Minimal Bacteriocidal Concentration

TABLE 2

FORMALDEHYDE-GLYCEROL (FG) AND FORMALDEHYDE-PROPYLENE GLYCOL (FP) DISINFECTANT PROPERTIES

| Organism | FG MIC[1] (Mg/ml) | FG MBC[2] (Mg/ml) | FP MIC[1] (Mg/ml) | FP MBC[2] (Mg/ml) |
|---|---|---|---|---|
| *B. subtilis* | 0.245 | 0.245 | 0.27 | 0.27 |
| *B. megaterium* | 0.245 | 0.245 | 0.27 | 0.27 |
| *B. brevis* | 0.245 | 0.245 | 0.27 | 0.27 |
| *E. coli* | 0.245 | 0.245 | 0.27 | 0.27 |
| *S. aureus* | 0.245 | 0.245 | 0.27 | 0.54 |
| *S. fecalis* | 0.245 | 0.245 | 0.27 | 0.54 |

[1]MIC is the Minimal Inhibitory Concentration
[2]MBC is the Minimal Bacteriocidal Concentration Tables 1 and 2 summarize the MIC and MBC data for each of the formaldehyde based disinfectants studied. The MIC and MBC values for all disinfectants are remarkably similar and this suggests that it is the formaldehyde present in each system that is the agent responsible for the disinfectant properties of the various solutions. Support for this hypothesis comes from the fact that MIC studies employing ten times the concentration of ethylene glycol, glycerol, and propylene glycol present in the MIC studies documented in Tables 1 and 2 did not visibly affect bacterial growth, i.e., these solvents per se were not bacteriocidal.

Thus, the disinfectant properties of all formaldehyde based disinfectants studied were very similar. The difference between the disinfectants being that FW possessed the strong and characteristic odor of a formaldehyde solution while the FEG, FG and FP solutions did not exhibit this property. Therefore, a new class of formaldehyde based disinfectants have been prepared which possess the disinfectant properties of formaldehyde without the strong and pungent odor associated with formaldehyde disinfection.

The MIC and MBC values for the FEG disinfectant were re-assayed after 40 days and the MIC and MBC values obtained were found to be essentially the same as those presented in Table 1. It appears that the new formaldehyde based disinfectants do not lose their effectiveness during short-term storage. Studies on the effects of long-term storage, i.e., approximately 1 year, are currently underway.

Because of the nature of MIC studies, the disinfectant properties of these disinfectants were determined in an aqueous system. The FP, FEG and FG solutions are non-aqueous systems and it was of interest to study the intrinsic disinfectant properties of these solutions in a non-aqueous environment. Attempts at defining the intrinsic disinfectant properties of the new formaldehyde based disinfectants using vegetative cells were not successful because ethylene glycol, glycerol and propylene glycol proved to be bacteriocidal to vegetative cells and/or the viscosity of ethylene glycol, glycerol and propylene glycol solutions did not allow a uniform distribution of vegetative cells in these media. The latter point made accurate, quantitative studies on microbio inactivation extremely difficult. Therefore, the intrinsic disinfectant properties of these new formaldehyde based disinfectants were studied using *B. Subtilis* var. niger spores.

Exposure of *B. Subtilis* spores to FW proved to be sporocidal and this sporocidal property was highly temperature dependent. FP was not sporocidal over the temperature range studied, i.e., from about 20°C to 40°C. Suspension of spores in propylene glycol or water for 3 hours at 23°C to 40°C also was not sporocidal to *B. Subtilis* spores. However, FP dissolved in water (FP-W) became sporocidal and exhibited the characteristic temperature dependent sporocidal property of formaldehyde disinfection. Spores suspended in solutions made up with 9 parts water and 1 part propylene glycol were not inactivated on heating from 23°C to 40°C for 3 hours.

FG and FEG were not sporocidal per se, but became sporocidal on dissolution in water. The sporocidal properties of FG-W and FEG-W were determined at 40°C and at this temperature their sporocidal activity was comparable to FP-W at this same temperature. Glycerol, ethylene glycol, aqueous glycerol (1:10 dilution), and aqueous ethylene glycol (1:10 dilution) do not inactivate spores on exposure for 3 hours at 40°C.

The essential equivalence of the MIC-MBC values for FW, FG, FEG and FP towards a wide variety of bacteria suggests that it is the formaldehyde present in these formaldehyde based disinfectants which is causing the microbio inactivation. It should be emphasized that the 10% stock FW, FEG, FG and FP solutions differed in that the FW solutions exhibited the characteristic irritating vapors associated with formaldehyde solutions while the FEG, FG and FP did not possess this property. In the MIC-MBC studies, a 1:10 dilution of the stock formaldehyde based disinfectant solutions was effected using 4% Trypticase Soy Broth, and therefore all disinfectant solutions used in the MIC-MBC studies were essentially aqueous solutions. As previously noted, in such aqueous solutions FW, FEG, FG and FP all exhibited essentially the same disinfectant properties (Tables 1 and 2).

It was necessary to employ *B. Subtilis* spores in attempting to determine the intrinsic disinfectant properties of FEG, FG and FP solutions. Studies show that these solutions per se, in a non-aqueous environment, are not sporocidal over the temperature range 23°C to 40°C. These sporocidal experimentals are in apparent variance with the MIC-MBC experimentation and indicate that the non-aqueous disinfectant solutions have the formaldehyde bound in some manner which does not permit the disinfectant properties of formaldehyde to be expressed. However, dissolution of FG, FEG and FP in water produces an essentially aqueous system which apparently releases the bound formaldehyde with subsequent disinfection. Such a release of bound formaldehyde is in fact observed when FEG, FG and FP solutions are dissolved in water yielding the disinfectant solutions FEG-W, FG-W, and FP-W. These aqueous solutions are sporocidal and exhibit the characteristic temperature dependent sporocidal property associated with formaldehyde disinfection.

The mechanism for the proposed binding of formaldehyde and the release of bound formaldehyde in various solutions is not completely understood. However, the provision of disinfectants which possess the disinfectant property of formaldehyde without its concomitant irritating properties makes possible safe and effective pharmacological uses of the materials of the invention.

It is to be realized that only preferred embodiments of the invention have been disclosed and that numerous modifications, substitutions and alterations are all permissible without departing from the spirit and scope of the invention as defined in the following claims.

What is claimed is:

1. A method of synthesizing a disinfectant comprising contacting paraformaldehyde with an organic polar solvent selected from the group consisting of ethylene glycol, propylene glycol, and glycerol, said paraformaldehyde being present in an effective amount below 20% by weight of said paraformaldehyde and solvent, heating said paraformaldehyde in said solvent to obtain a clear solution and to effect formation of a stable disinfectant product absent the characteristic odor and irritation of paraformaldehyde.

2. The method according to claim 1 wherein said heating is to a temperature in the range of from above 100°C to the reflux temperature of said paraformaldehyde with said solvent.

3. The method of claim 2 wherein said heating is at the reflux temperature of said paraformaldehyde with said solvent.

4. The disinfectant product absent the characteristic odor and irritation of formaldehyde made according to the method of claim 1.

* * * * *